United States Patent [19]
De Bruyn et al.

[11] Patent Number: 6,087,611
[45] Date of Patent: Jul. 11, 2000

[54] DEVICE FOR HANGING A MANUALLY CONTROLLED STATION FOR WELDING TONGS IN AN ASSEMBLY LINE

[75] Inventors: Gérard De Bruyn, Antony; Michel Beffrieu, 27 avenue Foch, 93460 Gournay, both of France

[73] Assignees: Michel Beffrieu, Gournay; Christine Menage; Armand Dawidowicz, both of Neuilly sur Seine, all of France

[21] Appl. No.: 09/284,622
[22] PCT Filed: Oct. 29, 1997
[86] PCT No.: PCT/FR97/01940
§ 371 Date: May 19, 1999
§ 102(e) Date: May 19, 1999
[87] PCT Pub. No.: WO98/18590
PCT Pub. Date: May 7, 1998

[30] Foreign Application Priority Data

Oct. 31, 1996 [FR] France ................................. 96 13341
Mar. 25, 1997 [FR] France ................................. 97 03607

[51] Int. Cl.$^7$ ............................... B23K 9/32; B23K 3/06
[52] U.S. Cl. ...................................... 219/86.25; 219/86.21
[58] Field of Search .............................. 219/86.25, 86.21, 219/90, 86.1

[56] References Cited

U.S. PATENT DOCUMENTS

| | | | |
|---|---|---|---|
| 4,349,718 | 9/1982 | Carota et al. | 219/90 |
| 4,663,510 | 5/1987 | Ritter | 219/86.1 |
| 4,771,160 | 9/1988 | Pitsch et al. | 219/85.25 |
| 5,739,499 | 4/1998 | Suzio et al. | 219/86.25 |

FOREIGN PATENT DOCUMENTS

| | | |
|---|---|---|
| 0 685 290 | 12/1995 | European Pat. Off. |
| 43 23 517 | 1/1995 | Germany. |
| 550 14 177 | 1/1980 | Japan. |

Primary Examiner—Patrick Ryan
Assistant Examiner—Anjan Dey
Attorney, Agent, or Firm—Young & Thompson

[57] ABSTRACT

A supporting device for a station for welding tongs hung in an assembly/production liner, consisting of a bracket provided with at least one member for catching a pair of tongs and a system for balancing the tongs in a vertical position, the bracket being integral with a shank. The components and accessories of the station for welding tongs other than the welding tongs, such as the transformer, the switch cupboard, the fluid panel and the programmable control are fixed on the shank and/or the bracket. The bracket further has at its free end an arm supporting the system for catching and balancing the tongs and articulated on the bracket about an axis parallel to the shank. The device is applicable to stations for welding tongs.

14 Claims, 2 Drawing Sheets

DEVICE FOR HANGING A MANUALLY CONTROLLED STATION FOR WELDING TONGS IN AN ASSEMBLY LINE

CROSS-REFERENCE TO RELATED APPLICATION

This is the 35 USC §371 national stage of International application PCT/FR97/01940 filed on Oct. 29, 1997, which designated the United States of America.

The present invention relates to the field of assembly lines, particularly for automotive vehicles. In such lines, there are used numerous manually controlled tools supplied with electricity and/or fluid. An example of such a tool is a welding tong station which comprises, in addition to the welding tong itself, various other components such as a programmable welding control, a welding transformer, a static contactor with thyristors, etc.

BACKGROUND OF THE INVENTION

Until now, to permit movement of a welding tong necessary for the production process, it was usual to suspend said welding tong and its accessories from rolling rails, which are fixed to the framework of the assembly plants by removable sub-frames. Such an installation requires connection to the ground of the welding tong, by means of a connection foot, and an associated detection system.

The assembly of the sub-frame bearing the rolling rails must be constructed as a function of the assembly line in question, such that dismantling is necessary for installing a new line with its specific rail system. These operations are long and costly, the structure constituted by the subframe and the rolling rails being itself difficult to design, produce and assemble.

A modification of the assembly line is extremely difficult and costly.

Another drawback of the known system which has been described resides in the great difficulty of reusing in a new line the material thus installed, because of the specific definition of the suspended working station.

Repairs and exchanges of components are also difficult because of the suspension of a working unit which must accordingly be as integrated as possible.

There are also known several devices for suspension of manually controlled tools.

Thus, from JP-A-59037006, there is known a work station for a piercing tool in which said tool is carried by a suspended mast with a bracket along which said mast is displaceable. This bracket is moreover connected to one end of a support resting on the ground and about which it is movably driveable.

Such a device requires in the first instance a counterweight on the mast itself so as to counterbalance the weight of the piercing tool and then requires perfect securement of the central support carrying the bracket. Thus, when said mast is brought to the end of the bracket, this can generate a twisting force on the central support which has to be countered by good securement. Once the piercing tool has been brought adjacent the object to be pierced, as recognized by an electromagnetic magnet, this piercing tool is correctly positioned. This positioning takes place manually by manipulation of handles suitable to displace said tool forwardly and rearwardly, up and down and from left to right.

The tool in question being a piercing tool, it is necessary to obtain precise positioning of said tool. However, in the case of the welding tong, it is on the contrary important to provide complete freedom of manipulation in movement of said tool by the user and such a device therefore cannot be used in a welding station.

There is also known, from U.S. Pat. No. 4,969,625, a device for manually controlled tools, in particularly a fastening device in which there is provided a drive means for moving said tool back and forth, laterally, forwardly and rearwardly and vertically, as well as for driving it in rotation. These means are provided on a longitudinal axle whose one end is secured on a vertical mast having a positioning plate and whose other end carries the tool. The device also comprises torsion reaction means and means for securing the mast in a working plane. However, this device has a particularly complicated and rigid structure which also does not give complete freedom of manipulation and movement for the user.

The device described in U.S. Pat. No. 3,608,578 also relates to a device for manual tools in which a mast is mounted on a workbench and comprises a support. This support comprises a transport mechanism which moves along the latter and which carries a balancing device having a cable to which is fixed the tool. To drive the tool in displacement to the desired working position, one pulls on the cable. This support is mounted pivotably about the mast and comprises at its other end a filter and a lubricator connected by a conduit to a source of compressed air.

This filter and this lubricator can also serve as counterweights for the balancing device of the tool. However, the positioning of these members prevents the latter from being too voluminous and moreover, during maintenance or repair operations, these members are not readily accessible.

In U.S. Pat. No. 5,367,924, there is disclosed an arm support for a screw-making machine. This arm support permits avoiding transmission of the force of rotation generated by the screw-maker to the hands and to the wrists of the operator. This arm support moves in particular along an axis transverse to the suspended chassis. However, such a device is limited in its freedom of manipulation and displacement by the operator.

In DE-A-19623265, published after the priority application of the present application, there is described a device for suspending a welding tong comprising a column fixed to the ground on which is mounted, pivoting about it, an arm. The welding tong is mounted articulatedly, is displaceable vertically and forward and rearwardly with the help of a balancing device. The tong is also mounted on rolling rails mounted parallel to each other and perpendicular to the arm itself, such that said tong moves from left to right.

The welding transformer is also mounted on the support sufficiently high that users may pass below it without striking it. Also, when the mast is driven in rotation about the column in the course of different operations, this drive can be difficult because of the weight of the welding transformer, whilst the drive for moving it from left to right is limited by the length of the rolling rails.

The present invention seeks to overcome the drawbacks of the known systems.

SUMMARY OF THE INVENTION

To this end, the invention has for its object a device for supporting a welding tong station suspended in a production/assembly line, constituted by a bracket provided with at least one connection member to a tong and balancing means for said tong in the vertical position, said bracket being secured to a mast, characterized in that the components and accessories of the welding tong station other than the welding tong, such as the transformer, the electric cabinet, the fluid panel and the programmable control, etc., are fixed on the mast and/or the bracket, said bracket having moreover at its free end an arm carrying the connecting and balancing system for the tong and articulated on the bracket about an axis parallel to the mast.

The connection and balancing system for the welding tong can be fixed relative to said articulated arm where it can slide along said articulated arm.

Preferably, the bracket can be fixed relative to the mast, or else, as a modification, the bracket can be mounted rotatably about the axis of the mast.

Thus, a device according to the invention permits improved manipulation of the welding tong, in particular so as to improve the ergonomy for difficult stations, to the degree that the articulated arm mounted on the bracket is drivable pivotally about an axis parallel to the mast, preferably its axis of securement to the end of said bracket, which offers a supplemental degree of freedom for movement of the welding tong even when the bracket is fixed relative to the mast.

In the case in which the bracket is movable in rotation about the mast, the articulated arm offers a supplemental freedom of movement to manipulate the welding tong, without it being necessary to drive in rotation all the bracket about the mast, in particular when the latter carries at least one station component.

Preferably, the bracket of such a device is not loaded by the assembly of the various components at accessories of the welding station. This bracket can therefore be more easily driven in rotation about the mast, the load of said bracket and its inertia being reduced.

Moreover, the separate securement of the various components and accessories of the welding station other than the tong itself on the mast and/or the bracket, also permits facilitated handling and maintenance, in particular a replacement of the components which will be more simple than when they are integrated, for example united in a same housing.

Various types of emplacement could be envisaged.

According to a first embodiment, the mast rests on the ground by means of a sole or securement plate.

According to a second embodiment, the mast is fixed on the framework by means of a securement plate. Such a device therefore permits providing a tool support structure at positions where the surface of the ground is reduced.

It is also possible to provide moreover that the connection member is movable in translation along the bracket.

The device according to the invention permits obtaining a support structure for heavy tools which is easy to emplace and economical, in the form of a mounting/assembly line, by requiring almost no infrastructure modification of the building. The devices according to the invention can be reused, if desired after reconditioning or be obtained from recovered and reused components in this form.

In particular, the separate securement of the elements of the station, other than the tong itself, on the mast and/or on the bracket permits distribution of the masses in the vicinity of the axis of the mast, which involves the use of a plate or securement sole of relatively small surface and a securement of this sole by a very limited number of anchor points to the ground or to the framework.

BRIEF DESCRIPTION OF THE DRAWINGS

The invention will be better understood from a reading of the following description, with reference to the accompanying drawings, in which.

DESCRIPTION OF THE PREFERRED EMBODIMENTS

Figure 1:
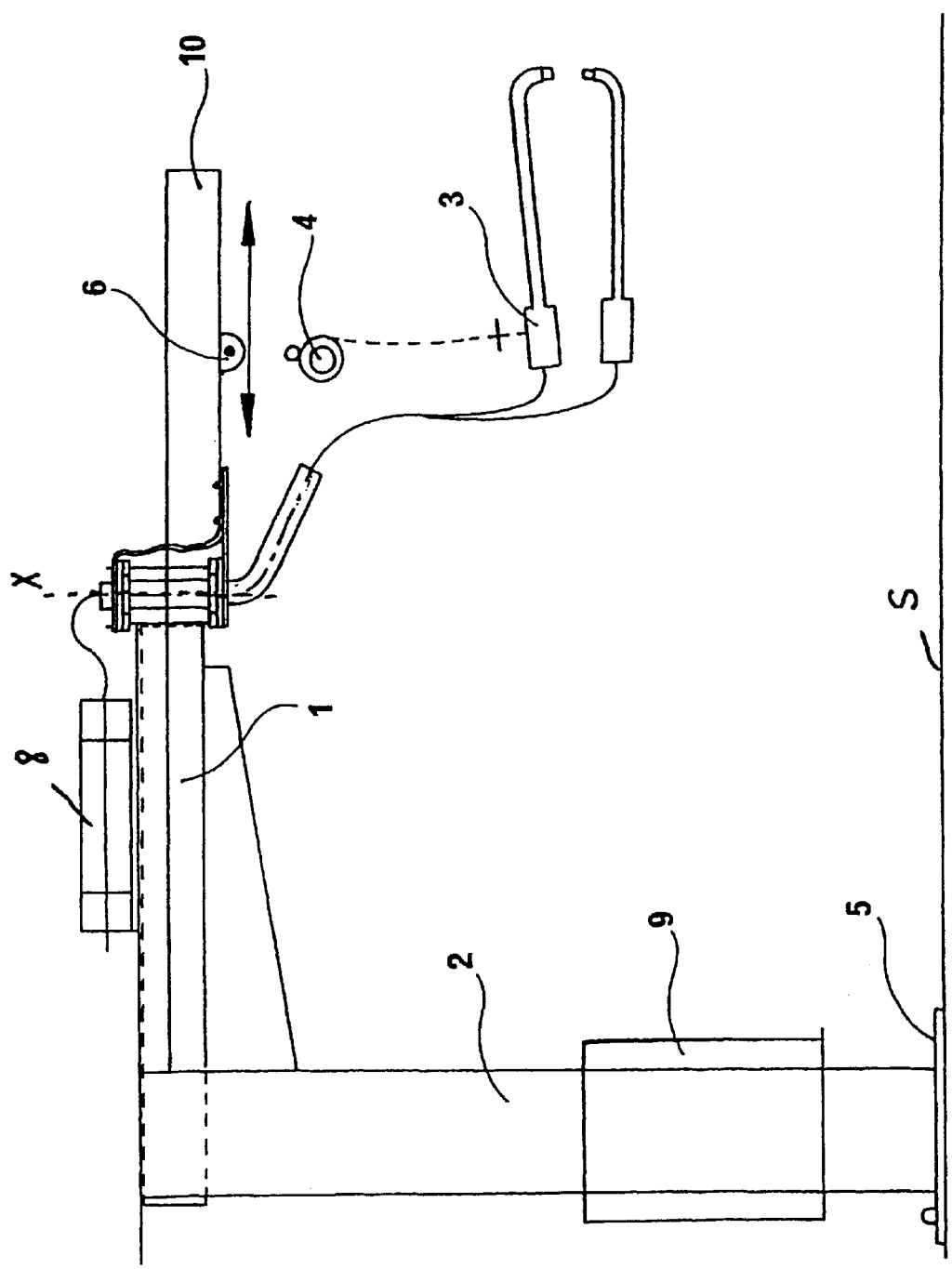
FIG. 1 is a schematic elevational side view of a support device for a welding tong station according to one embodiment of the invention.
Figure 2:
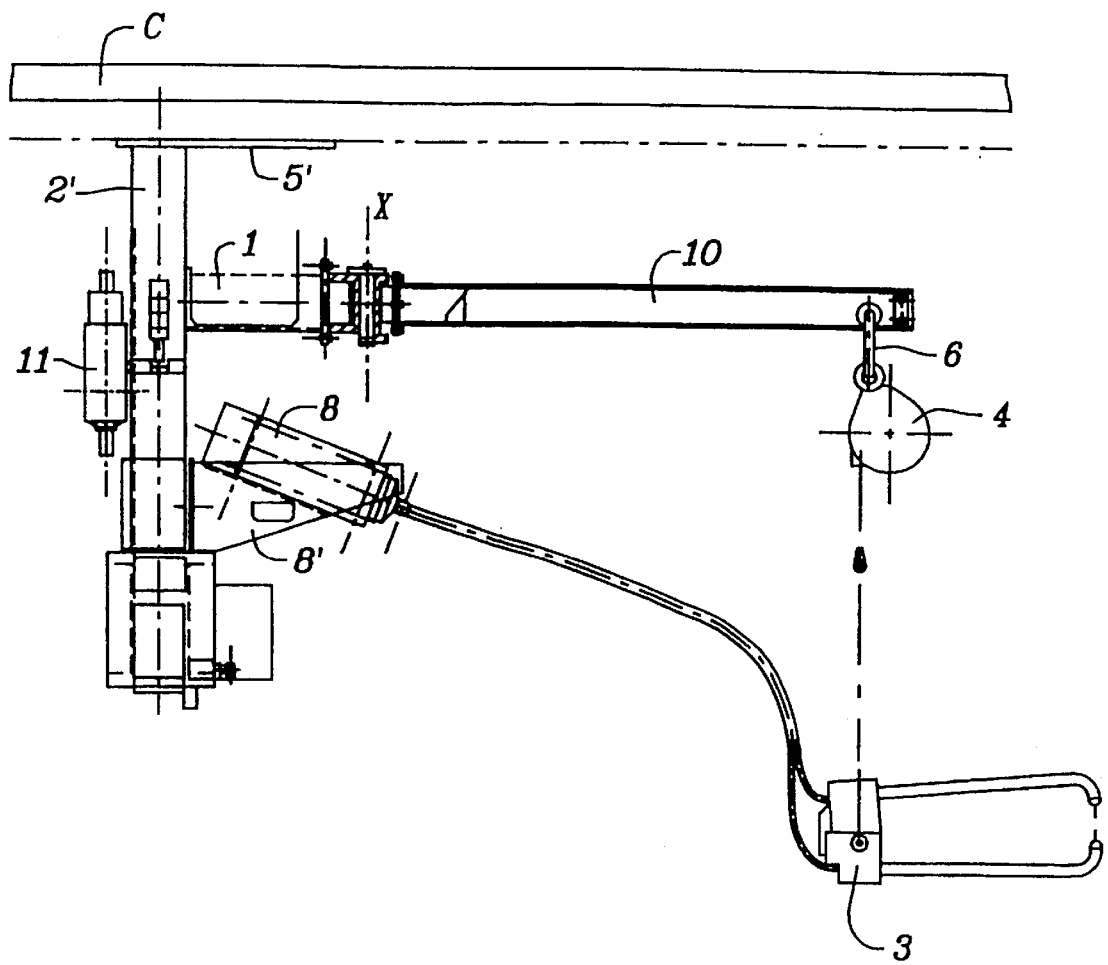
FIG. 2 is similar to FIG. 1, for a modified embodiment of the invention.

The support device according to the invention, as shown schematically in FIGS. 1 and 2, comprises a bracket 1 secured respectively to a mast 2 resting on the ground S or with a mast 2' fixed on a framework C. The bracket 1 has at its free end an articulated arm 10. A welding tong 3 is connected to the articulated arm 10, for example by a counterweight 4 or the like, so as to be movable vertically.

The arm 10 is articulated at the end of the bracket 1 to be driven in rotation about an axis parallel to the mast 2 or 2', preferably its securement axis X on said bracket 1.

In a simple embodiment, the tong 3 is fixed in translation relative to the articulated arm 10 and the bracket 1 is fixed relative to the mast 2 or 2'.

It is also possible to conceive of a modification in which the bracket 1 can pivot about the axis of the mast 2 or 2'. It suffices for this purpose that the mast 2 or 2' be mounted pivotally about its own axis, by means of a bearing, relative to a plate 5 for connection to the ground S or a plate 5' for connection to the framework C.

This pivoting can be limited by abutments, for example rubber abutments or hydraulic inertial shock absorbers, disposed correspondingly on the mast 2, 2' and/or on its axle of rotation (not shown). There can be provided adjustable or displaceable abutments to adjust the angular swing to the use envisaged and to the ergonomy of the tool.

A more sophisticated modification can provide the possibility of horizontal sliding of the tong 3 by linear displacement of its securement 6 along the articulated arm 10.

The plate 5 or 5' can take various forms.

Thus, in a first embodiment, the plate 5 is fixed to the ground S by anchor means, such as artificial plugs. The adjustment of the level could for example be carried out by screw jacks.

In a second embodiment, the plate 5 comprises slots for loading and unloading by the fork of a lift truck. The securement and adjustment are then effected as in the first embodiment.

In a third embodiment, the plate 5 is constituted by a welded mechanical assembly comprising a securement plate movable on a rail fixed to the ground. The securement can then be carried out as in the first embodiment. As a modification, the securement plate can be in the form of a carriage, which gives a supplemental dimension of movement to the tool, for example between two work stations.

As to the plate 5', it is preferably secured to the framework C by mechanical anchor means such as anchors or bolts.

In any case, the balancing of the tong 3 can be carried out by means of a known balance available in commerce or by a system of cables, pulleys and counterweights, the counterweight sliding in the mast 2, 2' and being adjustable by addition or subtraction of weights.

The device according to the invention permits avoiding sub-frameworks and rolling rails, and offers the advantage of permitting securing and integrating various components and accessories on the mast 2, 2' and/or on the bracket 1. Thus, for the welding tong 3, as shown in FIG. 1, transformer 8 is in a cradle on the bracket 1, whilst the electrical cabinet 9, the fluid panel (cooling, overpressure, proportional valve, distributor, etc.) and the programmable control are fixed on the mast 2.

In the device shown in FIG. 2, the transformer 8 is in a cradle 8' on the mast 2' and the electrical cabinet, the fluid panel (cooling, overpressure 11, proportional valve, distributor, etc.) and the programmable control are fixed on the mast 2'.

The choice of components and their emplacement are thus greatly facilitated. But moreover, it can be provided to mount on the same support two tools used alternately and which will use, at least in part, the same accessories.

The device according to the invention could be provided with detectors for control of the various positions which the tong 3 can occupy, according to the various selected embodiments.

What is claimed is:

1. A support device for a welding tong station suspended in a production/assembly line, the device comprising
    a bracket having at least one connection member for a tong;
    balancing means for balancing said tong in a vertical position, said bracket being secured to a mast;
    a plurality of operatively associated components including a transformer, an electrical cabinet, a fluid panel, and a programmable control; said components being fixed on one of the mast and the bracket;
    said bracket having at its free end an articulated arm carrying the connection member and the balancing means for the tong;
    said arm being articulated on the bracket about an axis parallel to the mast; and
    abutments disposed on one of said mast and a pivotal axle thereof, for limiting the angular swinging of the bracket.

2. The device according to claim 1, wherein the connection member and balancing means slide along the articulated arm.

3. The device according to claim 1, wherein the connection member and balancing means are fixed relative to the articulated arm.

4. The device according to claim 1, wherein the bracket is fixed relative to the mast.

5. The device according to claim 1, wherein the bracket is rotatably mounted about the axis of the mast.

6. The device according to claim 5, wherein the abutments are one of rubber abutments and hydraulic energy shock absorbers.

7. The device according to claim 1, further comprising a plate provided with anchor means for fixing the mast to the ground.

8. The device according to claim 7, wherein the plate comprises a mechanical-welded assembly having a securement plate movable on a rail fixed to the ground.

9. The device according to claim 7, further comprising means for adjusting the level of the device.

10. The device according to claim 1, further comprising a plate for fixing the mast to a framework, said plate having slots structured and arranged to coact with a fork of a forklift truck.

11. The device according to claim 10, wherein the plate is fixed to the framework by mechanical anchor means.

12. The device according to claim 1, wherein the balancing means comprise a counterweight.

13. The device according to claim 1, wherein the balancing means comprise a system of cable, pulleys and counterweight, the counterweight sliding in the mast and being adjustable by addition or removal of weights.

14. The device according to claim 1, further comprising detectors for monitoring various positions occupied by the tong.

* * * * *